United States Patent
Hanson et al.

(10) Patent No.: US 9,307,085 B1
(45) Date of Patent: Apr. 5, 2016

(54) SYSTEM, METHOD, AND COMPUTER PROGRAM FOR PREDICTING AT LEAST ONE REASON FOR A CURRENT CALL RECEIVED FROM A CUSTOMER

(71) Applicant: Amdocs Software Systems Limited, Dublin (IE)

(72) Inventors: Craig Dean Hanson, Elk Grove, CA (US); Greg Verego, Ellijay, GA (US); Joseph Patrick O'Hara, Poole (GB)

(73) Assignee: Amdocs Software Systems Limited, Dublin (IE)

( * ) Notice: Subject to any disclaimer, the term of this patent is extended or adjusted under 35 U.S.C. 154(b) by 0 days.

(21) Appl. No.: 14/192,807

(22) Filed: Feb. 27, 2014

Related U.S. Application Data (60) Provisional application No. 61/802,766, filed on Mar. 18, 2013.

(51) Int. Cl.
- *H04M 3/00* (2006.01)
- *H04M 5/00* (2006.01)
- *H04M 3/51* (2006.01)
- *H04M 3/523* (2006.01)

(52) U.S. Cl.
CPC .............. *H04M 3/5183* (2013.01); *H04M 3/51* (2013.01); *H04M 3/5235* (2013.01)

(58) Field of Classification Search
CPC .... H04M 3/51; H04M 3/5235; H04M 3/5233
USPC ............. 379/265.02, 265.11, 265.12, 265.13, 379/266.01–266.03
See application file for complete search history.

(56) References Cited

U.S. PATENT DOCUMENTS

| | | | |
|---|---|---|---|
| 6,061,433 A | 5/2000 | Polcyn et al. | |
| 8,744,062 B2 * | 6/2014 | Pickford | 379/265.02 |
| 2008/0267388 A1 | 10/2008 | Odinak et al. | |
| 2009/0285385 A1 | 11/2009 | Dunbar et al. | |
| 2009/0310774 A1 | 12/2009 | Hendricks et al. | |
| 2011/0150206 A1 | 6/2011 | Pickford | |
| 2011/0299676 A1 * | 12/2011 | Hanson et al. | 379/265.03 |
| 2012/0290514 A1 * | 11/2012 | Frank et al. | 706/12 |

OTHER PUBLICATIONS

U.S. Appl. No. 14/201,724, filed Mar. 7, 2014.
Non-Final Office Action from U.S. Appl. No. 14/201,724, dated Jan. 29, 2015.
Final Office Action from U.S. Appl. No. 14/201,724, dated Aug. 26, 2015.
Non-Final Office Action from U.S Appl. No. 141201,724, dated Feb. 2, 2016.

* cited by examiner

*Primary Examiner* — Nafiz E Hoque
(74) *Attorney, Agent, or Firm* — Zilka-Kotab, PC (57) ABSTRACT

A system, method, and computer program product are provided for predicting at least one reason for a current call received from a customer. In operation, information associated with at least one transaction corresponding to at least one customer is identified. Additionally, relevant data associated with the at least one customer is determined, based on the at least one transaction. Further, at least one reason for a current customer call received from the at least one customer is predicted, based on the relevant data associated with the at least one customer.

14 Claims, 6 Drawing Sheets

SYSTEM, METHOD, AND COMPUTER PROGRAM FOR PREDICTING AT LEAST ONE REASON FOR A CURRENT CALL RECEIVED FROM A CUSTOMER

CLAIM OF PRIORITY

This application claims the benefit of U.S. Provisional Application No. 61/802,766, filed Mar. 18, 2013, the entire contents of which are incorporated herein by reference.

FIELD OF THE INVENTION

The present invention relates generally to handling customer calls by call center agents, and more particularly to predicting a reason for a current customer call.

BACKGROUND

Communication Service Providers (CSPs) operate call centers that handle customer calls. When a call center agent answers a call they typically identify the caller, ask the caller why they are calling, and then manually research the caller's transactions. The transactions may include orders, usage, bills, payments, and various other information.

The call agent may further manually research other data in order to understand the caller's issue. This process is time-consuming and error-prone. There is thus a need for addressing these and/or other issues associated with the prior art.

SUMMARY

A system, method, and computer program product are provided for predicting at least one reason for a current call received from a customer. In operation, information associated with at least one transaction corresponding to at least one customer is identified. Additionally, relevant data associated with the at least one customer is determined, based on the at least one transaction. Further, at least one reason for a current customer call received from the at least one customer is predicted, based on the relevant data associated with the at least one customer.

DETAILED DESCRIPTION

Figure 1:
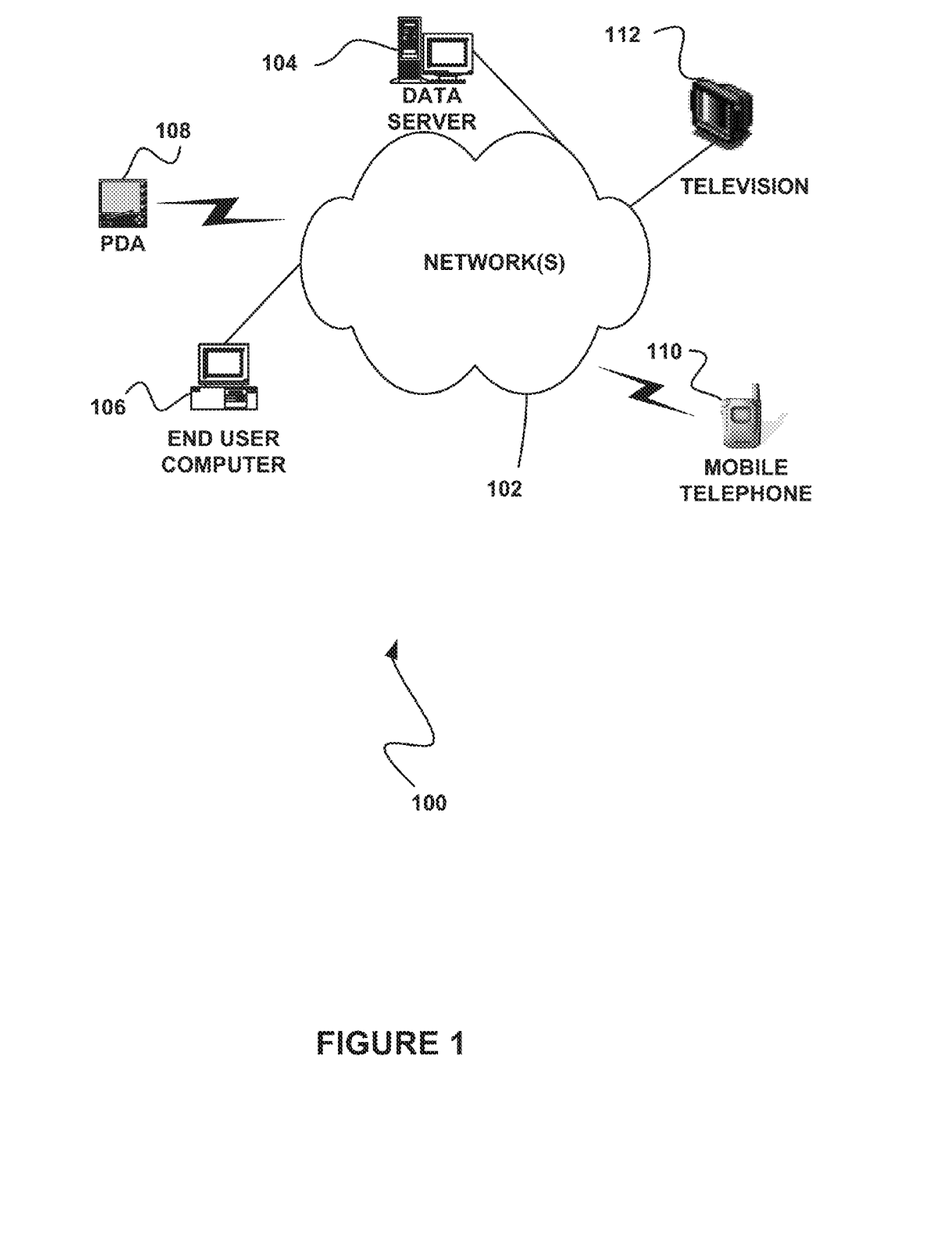
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
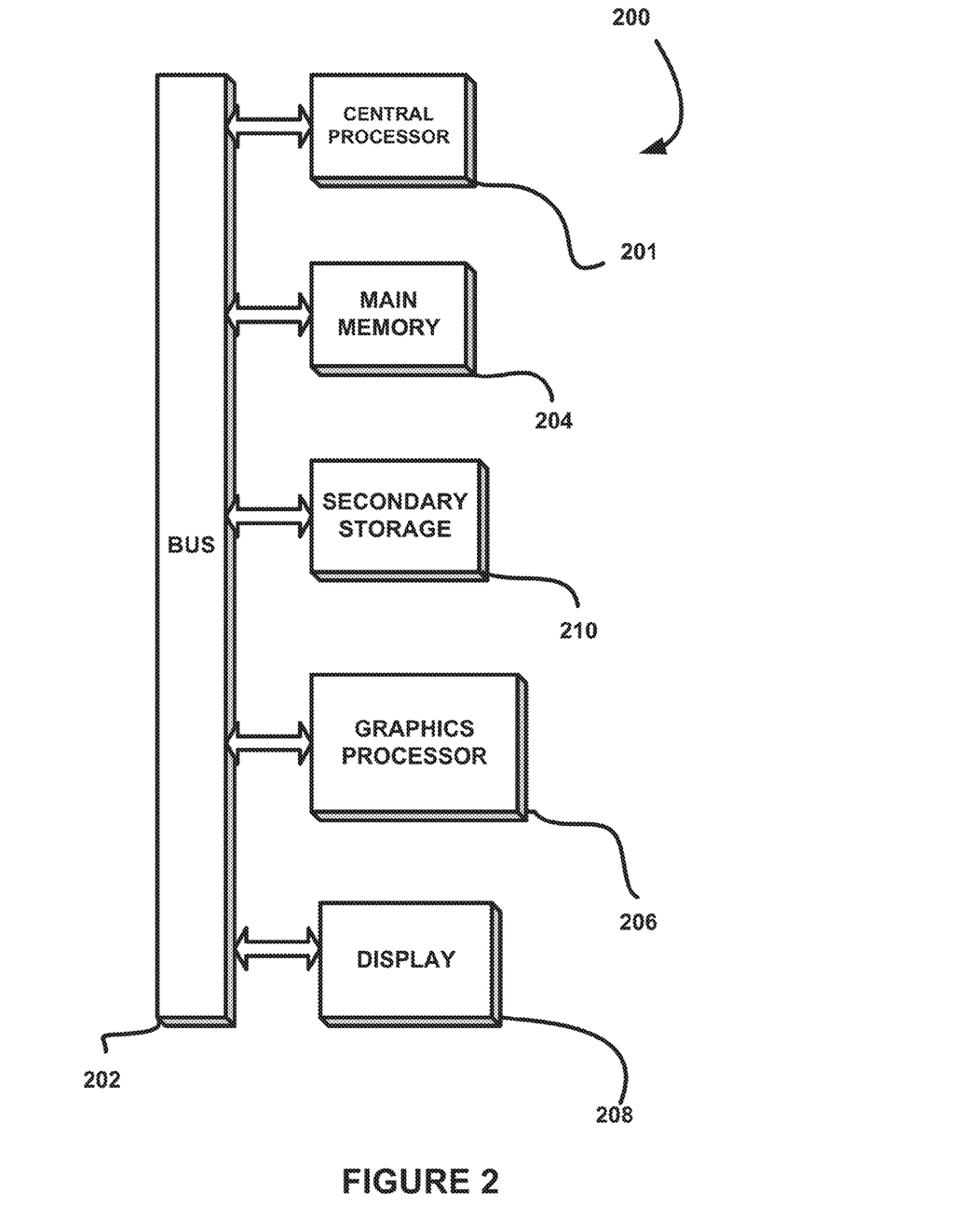
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
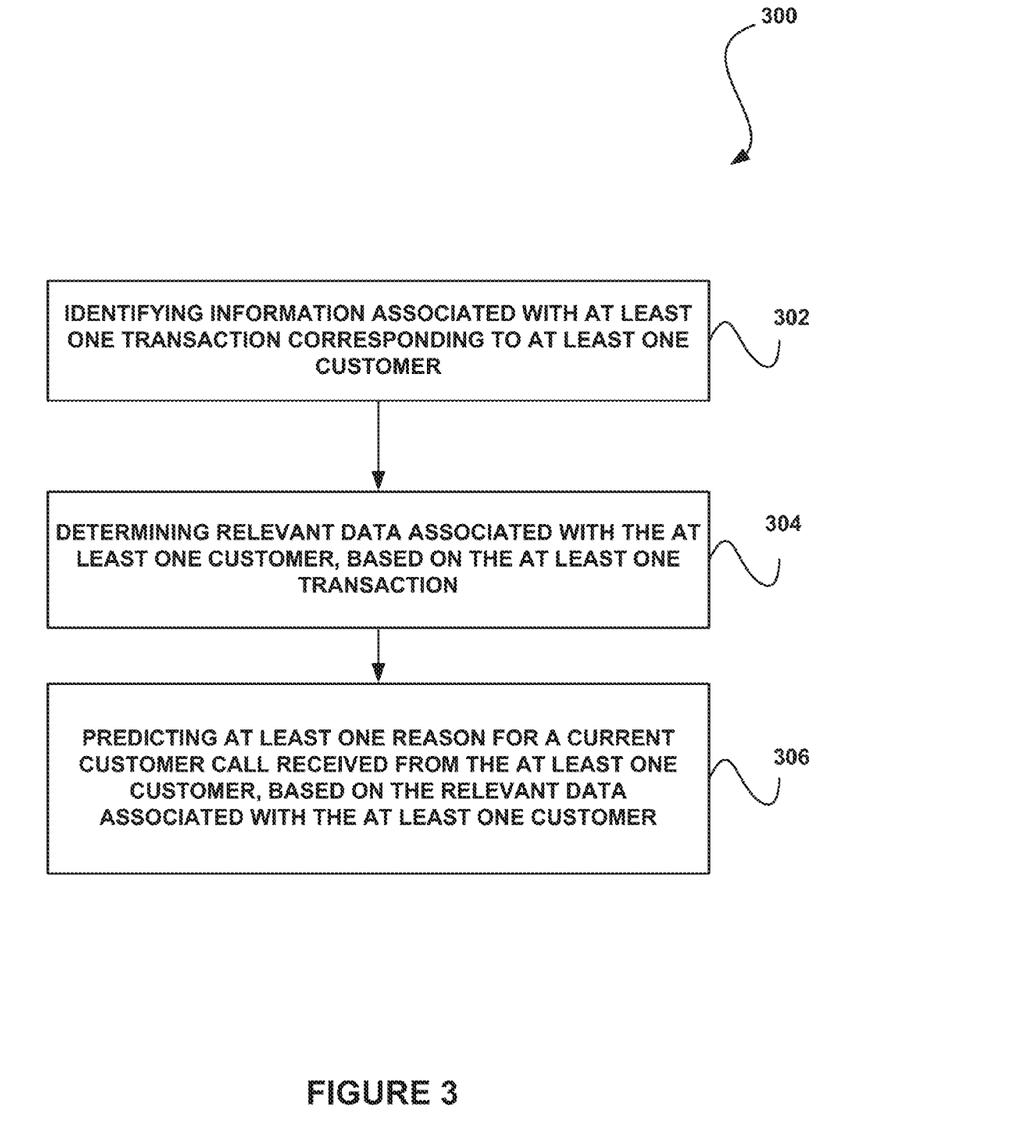
FIG. 3 illustrates a method for predicting at least one reason for a current call received from a customer, in accordance with one embodiment.

FIG. 3 illustrates a method 300 for predicting at least one reason for a current call received from a customer, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, information associated with at least one transaction corresponding to at least one customer is identified. See operation 302. In one embodiment, identifying the information associated with the at least one transaction corresponding to the at least one customer may include accessing a customer transaction database to retrieve the information associated with the at least one transaction.

The transaction may include any type of transaction associated with the customer. For example, in various embodiments, the transaction may include at least one of an order transaction, a usage transaction, a billing transaction, a payment transaction, a communication (e.g. a call, an email, etc.), and/or any other type of transaction. Accordingly, in various embodiments, the information associated with the transaction may include order information, usage information, bill information, payment information, and/or any other transaction related information.

In the context of the present description, a customer refers to any entity that conducts a transaction or desires to conduct a transaction with another entity. For example, in one embodiment, the customer may include a person who has purchased a product or a service. In another embodiment, the customer may include a person with a service plan (e.g. a phone service plan, an entertainment package plan, etc.).

As shown further in FIG. 3, relevant data associated with the at least one customer is determined, based on the at least one transaction. See operation 304. In various embodiments, the relevant data may include any data associated with the customer, the transactions associated with the customer, and/or any communications associated with the customer.

In one embodiment, determining the relevant data associated with the at least one customer, based on the at least one transaction, may include computing observations about the at least one transaction. For example, the observations may include any noteworthy data about the caller and/or about a history of associated transactions.

Based on the relevant data associated with the at least one customer, at least one reason for a current customer call received from the at least one customer is predicted. See operation 306. In various embodiments, the customer call may be received at a customer call center associated with any type of entity.

For example, in one embodiment, the customer call center may be associated with a service organization, a billing organization, a customer service organization, and/or any other entity. In one embodiment, the call may be received by a human call agent. In another embodiment, the call may be received by a virtual call agent.

Further, in one embodiment, the method 300 may include generating explanatory text including information about the at least one transaction that is relevant to the predicted at least one reason for the current customer call from the at least one customer. For example, comprehensive explanatory text that includes information about the customer transactions relevant to the call reason may be generated and/or displayed to a call agent utilizing a user interface.

Still yet, in one embodiment, the method 300 may include determining an appropriate action for a call agent to take, based on the determined relevant data and the predicted at least one reason for the current customer call. In one embodiment, the appropriate action may be presented to the call agent in the form of suggested actions.

In one embodiment, the relevant data associated with the at least one customer may be utilized as an input to a predictive model for predicting the at least one reason for the current customer call received from the at least one customer. As an option, the predictive model may include a probabilistic model capable of being utilized to predict the at least one reason for the current customer call received from the at least one customer. Further, in one embodiment, the predictive model may include a predictive model based on a Bayesian Belief Network. In some cases, the predictive model may be trained utilizing historical call data and at least one training algorithm, where the at least one training algorithm includes at least one expectation-maximization algorithm.

In one embodiment, predicting the at least one reason for the current customer call received from the at least one customer may include predicting a most likely reason for the current customer call. In some cases, predicting the at least one reason for the current customer call received from the at least one customer may include predicting a plurality of predicted reasons for the current customer call.

Additionally, in one embodiment, the predicted at least one reason for the current customer call received from the at least one customer may be displayed to a call agent utilizing a user interface. As an option, the user interface may display a plurality of predicted reasons for the current customer call to the call agent, such that the call agent is able to proactively address any of the plurality of predicted reasons for the current customer call. For example, even though the customer is calling about one reason, the call agent may see that there are other issues associated with the caller, based on the predictions, and the call agent may proactively address the issues to save the customer time and effort in making another call in the future.

In one embodiment, the prediction of the at least one reason for the current customer call may be based, at least partially, on historical call data associated with the at least one customer. For example, information associated with the current customer call placed by the at least one customer may be stored. This information may include any information associated with the call, such as the actual reason for calling, the issues addressed, any resolution, call duration, customer location, and/or various other information. In this case, the stored information associated with the current customer call placed by the at least one customer may be used to train a predictive model that is utilized for predicting the at least one reason for the current customer call. Accordingly, if the customer calls in the future, the predictive model may utilize this previous call information (along with other information) to better predict the reason for the call.

Utilizing this technique, a system may automatically identify issues and predict the most likely reason(s) for a customer's call. Additionally, the system may gather and present contextually relevant data that a call agent may need in order to understand the call. Further, the system may determine an appropriate action that the agent should take based upon the specific customer's issue and context. This reduces the call handling time and ensures that the call agent addresses all issues that affect the caller, reducing the likelihood of repeat calls by the caller.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
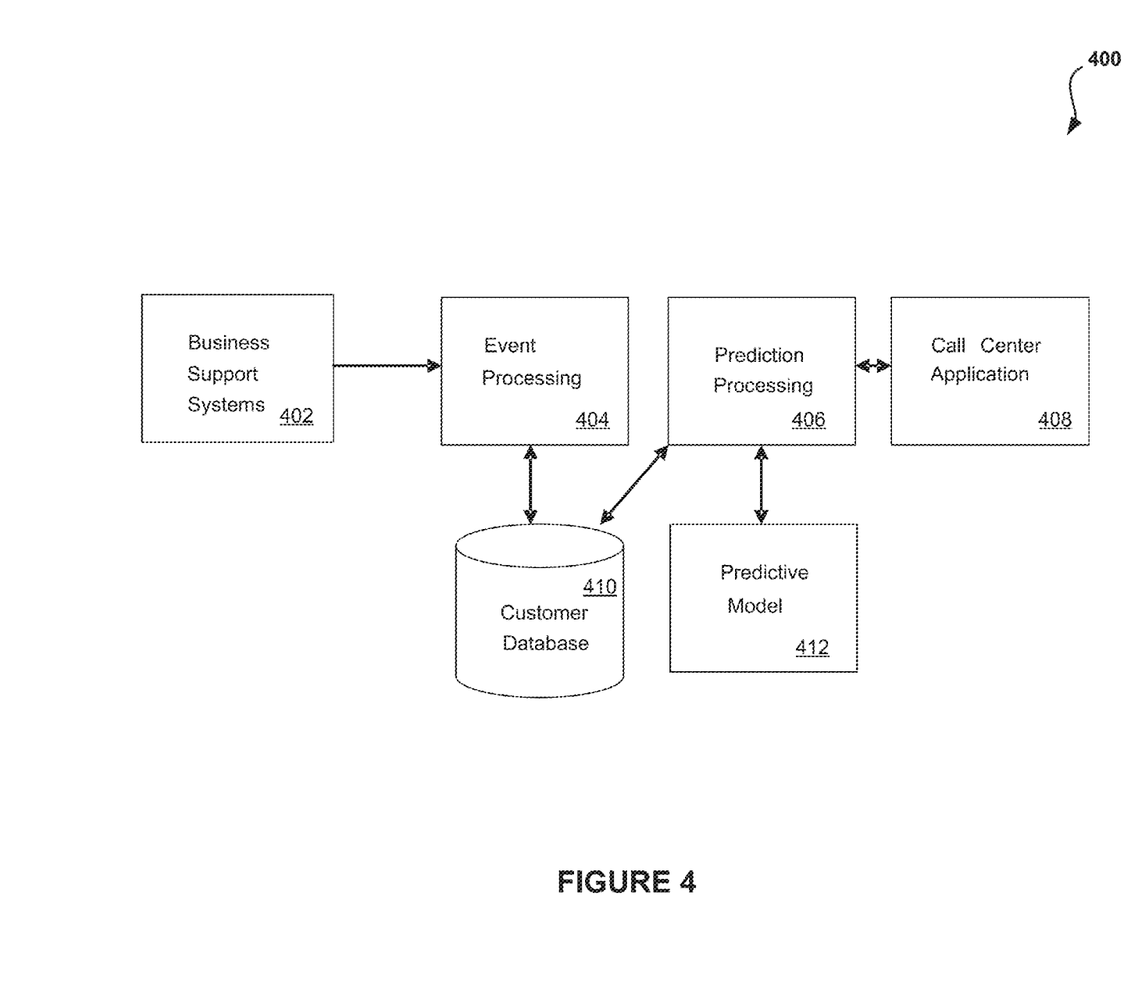
FIG. 4 illustrates a block diagram of a system for predicting at least one reason for a current call received from a customer, in accordance with one embodiment.

FIG. 4 illustrates a block diagram of a system 400 for predicting at least one reason for a current call received from a customer, in accordance with one embodiment. As an option, the system 400 may be implemented in the context of the details of FIGS. 1-3. Of course, however, the system 400 may be implemented in the context of any desired environment. Further, the aforementioned definitions may equally apply to the description below.

In operation, the system 400 may be utilized for predicting a call reason of a customer call to a call center, using a statistical model based on the caller's personal caller context data.

As shown, the system 400 includes Business Support Systems (BSS) 402. The Business Support Systems 402 include business systems that record and process transactions for the customer. This includes, but is not limited to, transactions associated with invoicing, accounts receivable, and customer relationship management (CRM). For invoicing, the Business Support Systems 402 function to compute charges and create bills for a customer. For accounts receivable transactions, the Business Support Systems 402 function to manage the customer balance and handle payments by the customer. In the context of customer relationship management, the Business Support Systems 402 function to record and manage customer calls.

The system 400 also includes an Event Processing component 404. In operation, the Event Processing component 404 processes information regarding customer transactions from the Business Support Systems 402. The Event Processing component 404 records the transaction information in a Customer Database 410. The information is organized such that it may be quickly accessed by a Prediction Processing component 406.

The Prediction Processing component 406 predicts the reason(s) for a customer call. In one embodiment, to accomplish this, the Prediction Processing component 406 accesses the Customer Database 410 to retrieve information about the customer's transactions.

Based on the customer's transactions, the Prediction Processing component 406 computes observations or relevant data about the customer, to utilize as input for a Predictive Model 412. The Prediction Processing component 406 accesses the Predictive Model 412, passing the customer observations as input and retrieving predicted call reasons as output. For each predicted call reason, the Prediction Processing component 406 formulates a comprehensive explanatory text that includes information about the customer transactions relevant to the call reason.

In one embodiment, the Predictive Model 412 may include a probabilistic model that predicts the call reason when a caller calls a call center. As an example, the Predictive Model 412 may have inputs, or evidence, which includes noteworthy data about the caller and the caller's history of transactions. In the context of the present description, this data may be referred to as observations or relevant data.

The Predictive Model 412 may further have outputs including predictions, which are the possible reasons for a customer call. In one embodiment, a computed probability may be associated with each reason (e.g. and displayed with each reason, etc.). One potential example of the Predictive Model 412 may include a Bayesian Belief Network.

In one embodiment, the Predictive Model 412 may be initially created by a business analyst who is an expert in the domain. For example, the analyst may define the observations that are appropriate for the model based on their knowledge of the Business Support Systems 402.

As an example, the latest customer bill may include roaming charges of $50. Additionally, the latest customer bill may include pro-rated charges of $12 for 10 days. Further, the analyst may see that the bill was sent 15 days ago, the bill is due in 5 days, and the bill has not yet been paid. In addition, the analyst may see that the customer inquired about roaming charges 3 months ago.

In response to these facts, the analyst may define the possible call reasons based on the reasons that are experienced in the call center. For example, the analyst may determine the following potential reasons for a call: the customer is calling to pay their bill; the customer is calling to inquire about roaming charges; and/or the customer is calling to inquire about pro-rated charges.

The analyst may also assign an initial influence of the observations on the motivations, based on his knowledge of customer behavior. For example, the analyst may determine the following: the customer is likely to be calling to pay their bill if the bill is due in the near future and it is not yet paid; the customer is likely to be calling to inquire about roaming charges if the bill includes roaming charges (e.g. and it is more likely the higher the charge, or more likely if they have inquired about roaming charges in the past, etc.); and/or the customer is likely to be calling to inquire about pro-rated charges if the bill includes pro-rated charges (e.g. and it is more likely if they have inquired about pro-rated charges in the past, etc.).

In one embodiment, the Predictive Model 412 may be trained with historical call data so that the model is better able to predict the probable reason(s) for a customer call. One example of the training process is described in further detail with reference to FIG. 5.

The Predictive Model 412 is operative to predict probable call reasons with sufficient accuracy, so that for a high proportion of calls the actual call reason appears in the prediction. As shown further in FIG. 4, the system 400 includes a Call Center Application 408. The Call Center Application 408 includes a software application that may be used by call center agents to handle and record customer calls. In some cases, the Call Center Application 408 may be part of an order capture system, care or CRM system, which may, in one embodiment, be included in the Business Support Systems 402 and may provide transaction information to the Event Processing component 404.

When a customer calls, the Call Center Application 408 makes a request to the Prediction Processing component 406 for a prediction of the probable call reasons. The results of the request are shown to the agent in a dedicated part of a suitable user interface.

The agent is able to examine the predicted call reasons, along with explanatory text containing contextual details for each reason. In one embodiment, this may be performed while greeting and authenticating the caller. In this way, when the caller gives the reason for the call, the agent is able to decide whether the reason matches one of the predicted call reasons.

If the reason matches one of the predicted call reasons, the agent already has the explanatory text that provides the historical information required to understand and respond to the call. This saves the agent from having to research the historical information for the caller, a process that typically takes between 1 and 5 minutes, thereby reducing the handling time for the call. Accordingly, in one embodiment, the prediction produced by the Prediction Processing component 406 and displayed to the agent utilizing the Call Center Application 408, may enable the agent to quickly understand the probable customer issues.

The agent is also able to proactively raise other predicted reasons with the caller, to see if there are any additional issues for the caller. If so, the agent can deal with the additional issue(s) during the current call. This potentially avoids a future customer call about the issue. Additionally, it may improve the customer satisfaction with the agent and the business.

The agent may then record the customer call, including the actual reason(s) why the customer called (as given by the customer), as data in the Call Center Application 408. This call data is part of the Business Support Systems 402 transaction history that is an input to the Event Processing component 404. Thereafter, the actual call reasons are available for training the Predictive Model 412.

In one embodiment, a user of the Call Center Application 408 may request a prediction from the Prediction Processing component 406. In another embodiment, this request may be made from additional applications.

For example, in one embodiment, an automatic call distribution system (i.e. the component of a telephony infrastructure that handles customer calls and routes them to call center agents, etc.) may identify the customer and make the prediction request to the Prediction Processing component 406. The automatic call distribution system may then use the returned prediction to route the call to one or more agents that have the skills required to handle the predicted call reason.

As an example, if the reason is predicted to be a device related issue for a mobile phone (e.g. an iPhone, etc.), the call should be routed to agents with the skills required to resolve mobile phone issues. If the reason is predicted to be an issue with excessive data usage, the call should be routed to agents with the skills required to resolve data usage issues.

In another embodiment, an intelligent voice response system, which automates customer call handling through voice or keypad response to recorded menus, may identify the customer and make the prediction request to the Prediction Processing component 406. The intelligent voice response system may then use the returned prediction to dynamically reconfigure the recorded menus so that the options corresponding to the most likely predicted call reasons are presented first, at the beginning of the menu. In addition, the menu option may itself be dynamically changed to include customer information appropriate to the call reason.

In one embodiment, the call handling system may use the prediction to modify the queuing of calls such that a call from a customer with a more severe or urgent reason for calling could be given priority in the queue.

Figure 5:
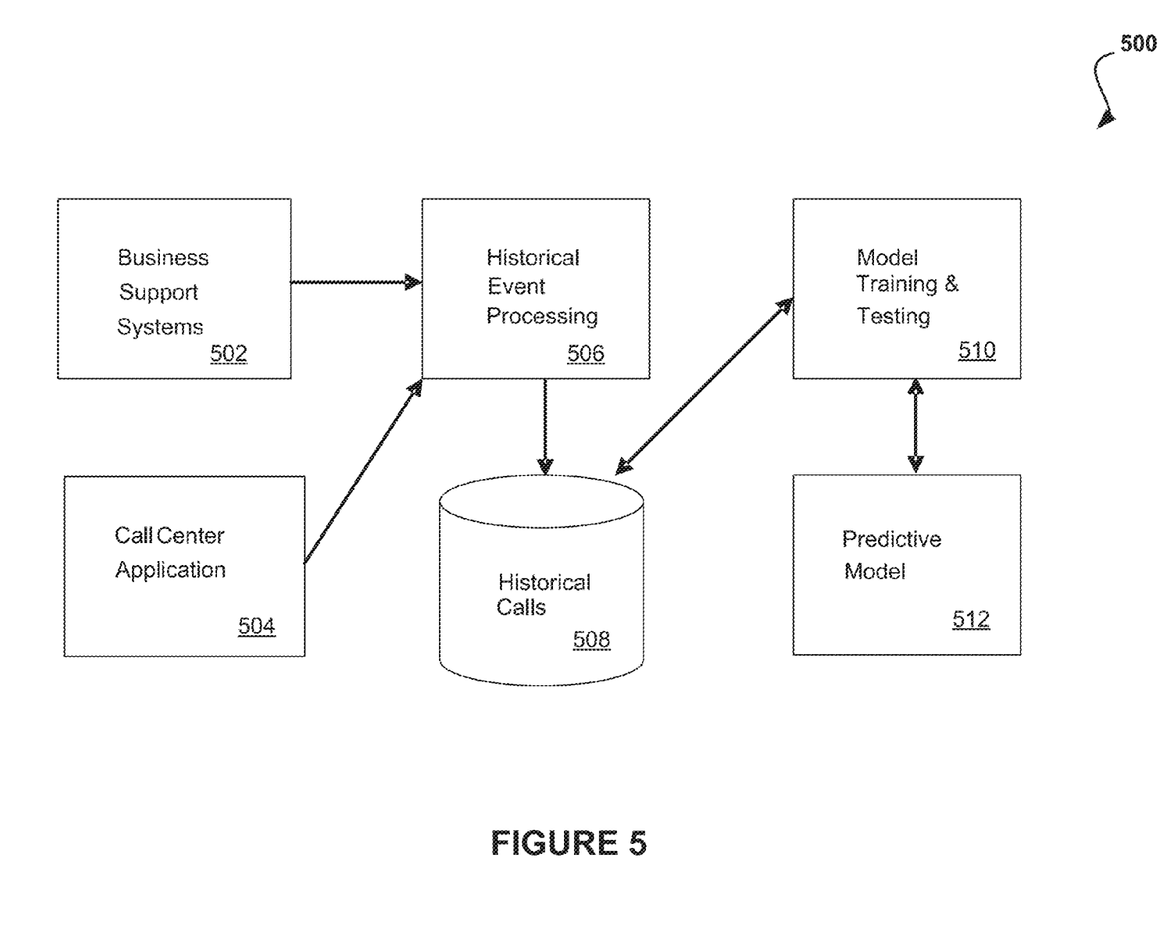
FIG. 5 illustrates a block diagram of a system for initially training a predictive model, in accordance with one embodiment.

FIG. 5 illustrates a block diagram of a system 500 for initially training a predictive model, in accordance with one embodiment. As an option, the system 500 may be implemented in the context of the details of FIGS. 1-4. Of course, however, the system 500 may be implemented in the context of any desired environment. Further, the aforementioned definitions may equally apply to the description below.

As shown, the system 500 includes Business Support Systems 502. The Business Support Systems 502 include business systems that record and process transactions for the customer. This includes, but is not limited to transactions associated with invoicing, accounts receivable, and customer relationship management (CRM). For invoicing the Business Support Systems 502 function to compute charges and create bills for a customer. For accounts receivable transactions, the Business Support Systems 502 function to manage the customer balance and handle payments by the customer. In the context of customer relationship management, the Business Support Systems 502 function to record and manage customer calls.

In operation, a Predictive Model 512 is typically initially trained before the Prediction Processing component (e.g. the Prediction Processing component 406) is deployed for use with customers. During the initial training process, historical events may be extracted for customers and may be processed by a Historical Event Processing component 506.

The system 500 further includes a Call Center Application 504 that includes a software application capable of being used by call center agents to handle and record customer calls. The Call Center Application 504 may include any agent facing application. In one embodiment, the Call Center Application 504 may be part of a CRM system (e.g. one of the Business Support Systems 502, etc.) that provides transaction information to the Historical Event Processing component 506.

The Historical Event Processing component 506 processes historical information about customer transactions from the Business Support Systems 502, populating a Historical Call database 508 that is used by a Model Training and Testing component 510. In one embodiment, the processing may include processing the customers' transactions in chronological order maintaining the state of each customer, and when a historical customer call is processed, recording the historical call in the database.

In one embodiment, the record may include the customer's observations, for use by the Predictive Model 512. These observations may be computed based on the customer state at the time of the call.

In another embodiment, the record may include the actual reason for the customer call. This may be determined by categorical annotations made by the handling agent or text processing of that agent's notes.

The Historical Calls database 508 is a database of the historical calls for a set of customers for a period of time. The data in the Historical Call database 508 may be stored in a format suitable for training the Predictive Model 512.

The calls may be computed by the Historical Event Processing component 506 and may be used by the Model Training and Testing component 510. In one embodiment, the Model Training and Testing component 510 may use data in the Historical Calls database 508 to train and test the Predictive Model 512. One exemplary implementation of a method the Model Training and Testing component may utilize for initial training is shown in FIG. 6.

In one embodiment, the Predictive Model 512 may include a probabilistic model that predicts the call reason when a caller calls the call center. As noted, the Predictive Model 512 may be initially trained using the system shown in FIG. 5 and the method shown in FIG. 6. Once the Predictive Model 512 is trained with historical data, it may be deployed into a production system.

During production operation, the Call Center Application 504 records calls, which are then processed by the Event Processing component (e.g. the Event Processing component 404 of FIG. 4, etc.). This component may also record further calls in the Historical Call database 508, so that the new calls can be used for further rounds of model training and testing, enabling the Predictive Model 512 (and 412) to adapt over time.

Figure 6:
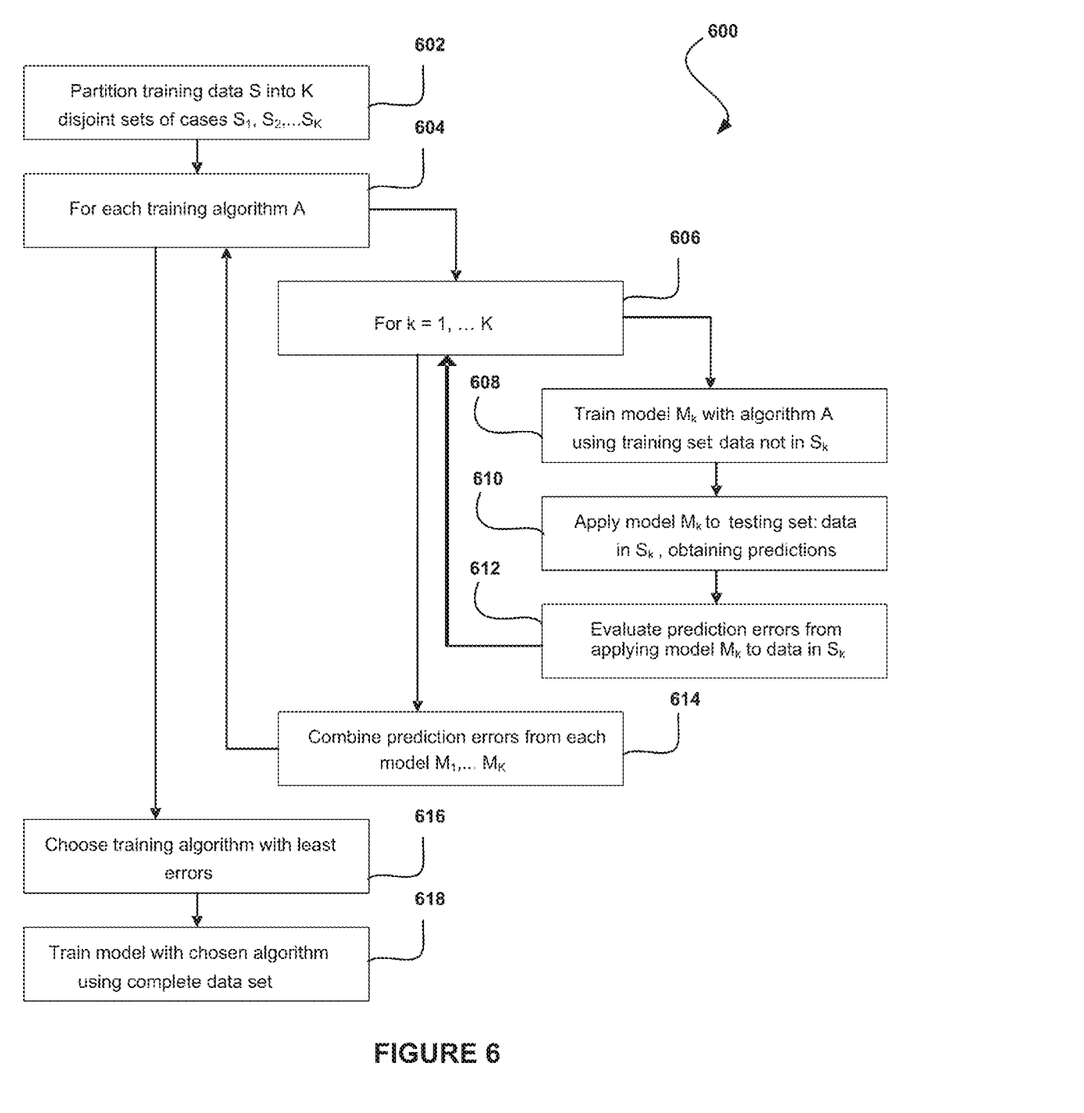
FIG. 6 illustrates a method for training and testing a predictive model with historical call data, in accordance with one embodiment.

FIG. 6 illustrates a method 600 for training and testing a predictive model with historical call data, in accordance with one embodiment. As an option, the system 600 may be implemented in the context of the details of FIGS. 1-5. Of course, however, the system 600 may be implemented in the context of any desired environment. Further, the aforementioned definitions may equally apply to the description below.

As shown, training data S is partitioned into K disjoint sets of cases, $S_1, S_2, \ldots S_K$. See operation 602. For each possible training algorithm A, each model $M_k$ is trained with algorithm A, using a training set. See operations 604, 606, and 608. Further, the model $M_k$ is applied to the testing set $S_k$. See operation 610. Prediction errors are then evaluated, resulting from the application of $M_k$ to data in the testing set $S_k$. See operation 612. The prediction errors are then combined for each model. See operation 614.

The training algorithm with the least errors is then chosen to be the training algorithm. See operation 616. The predictive model is then trained with the chosen model, using a complete data set. See operation 618.

In this way, the method 600 may function to choose the best training algorithm from a number of well-known training algorithms. As one example, the algorithm may include the expectation-maximization algorithm. This algorithm alternates computing expected values of the unobserved variables conditional on observed data, with maximizing the complete likelihood (or posterior), assuming that previously computed expected values are correct.

As shown, the method 600 accomplishes this by evaluating the errors of each training algorithm using the technique of cross-validation, where the errors are combined for a number of rounds of cross-validation. This involves partitioning the training data into complementary subsets, training the model on one subset (e.g. called the training set), and evaluating the prediction errors using the trained model on the other subset (called the testing set). The algorithm with the least errors is used to train the model using the complete data set.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising computer code for:
   storing, by a system, information in a hardware database of the system that is associated with a plurality of transactions conducted by the customer, the information including order information, usage information, bill information, payment information, and historical call data detailing historical calls made by the customer, including for each call:
   a reason for the customer's call,
   issues addressed during the call,
   a resolution of the call,
   a duration of the call, and
   a location of the customer during the call;
   partitioning the stored information into a first subset and a second subset,
   identifying a plurality of training algorithms,
   for each of the plurality of training algorithms:
      training a predictive model utilizing the training algorithm and the first subset of the stored information,
      testing the trained predictive model by applying the trained predictive model to the second subset of the stored information,
      evaluating a first plurality of prediction errors resulting from the application of the trained predictive model to the second subset of the stored information,
      training the predictive model utilizing the training algorithm and the second subset of the stored information,
      testing the trained predictive model by applying the trained predictive model to the first subset of the stored information,
      evaluating a second plurality of prediction errors resulting from the application of the trained predictive model to the first subset of the stored information, and
      combining the first and second plurality of prediction errors to create a combined number of prediction errors associated with the training algorithm;
   selecting one of the plurality of training algorithms having a smallest combined number of associated prediction errors;
   training by the system the predictive model using the selected training algorithm and the stored information; and
   predicting by the system at least one reason for a current customer call received from the at least one customer, utilizing the predictive model.

2. The computer program product of claim 1, further comprising computer code for receiving the current customer call from the at least one customer at a customer call center.

3. The computer program product of claim 1, further comprising computer code for generating explanatory text including information about the at least one transaction that is relevant to the predicted at least one reason for the current customer call from the at least one customer.

4. The computer program product of claim 1, further comprising computer code for determining an appropriate action for a call agent to take, based on the determined relevant data and the predicted at least one reason for the current customer call.

5. The computer program product of claim 1, wherein the computer program product is operable such that the predictive model includes a probabilistic model capable of being utilized to predict the at least one reason for the current customer call received from the at least one customer.

6. The computer program product of claim 1, wherein the computer program product is operable such that the predictive model includes a predictive model based on a Bayesian Belief Network.

7. The computer program product of claim 1, wherein the computer program product is operable such that predicting the at least one reason for the current customer call received from the at least one customer includes predicting a most likely reason for the current customer call.

8. The computer program product of claim 1, wherein the computer program product is operable such that predicting the at least one reason for the current customer call received from the at least one customer includes predicting a plurality of predicted reasons for the current customer call.

9. The computer program product of claim 1, further comprising computer code for storing information associated with the current customer call placed by the at least one customer.

10. The computer program product of claim 1, further comprising computer code for displaying the predicted at least one reason for the current customer call received from the at least one customer to a call agent utilizing a user interface.

11. The computer program product of claim 1, further comprising computer code for displaying a plurality of predicted reasons for the current customer call received from the at least one customer to a call agent utilizing a user interface such that the call agent is able to proactively address any of the plurality of predicted reasons for the current customer call.

12. The computer program product of claim 1, wherein the plurality of training algorithms include at least one expectation-maximization algorithm.

13. A method, comprising:
   storing, by a system, information in a hardware database of the system that is associated with a plurality of transactions conducted by the customer, the information including order information, usage information, bill information, payment information, and historical call data detailing historical calls made by the customer, including for each call:
   a reason for the customer's call,
   issues addressed during the call,
   a resolution of the call,
   a duration of the call, and
   a location of the customer during the call;
   partitioning the stored information into a first subset and a second subset,
   identifying a plurality of training algorithms,
   for each of the plurality of training algorithms:
      training a predictive model utilizing the training algorithm and the first subset of the stored information,
      testing the trained predictive model by applying the trained predictive model to the second subset of the stored information, evaluating a first plurality of prediction errors resulting from the application of the trained predictive model to the second subset of the stored information, training the predictive model utilizing the training algorithm and the second subset of the stored information, testing the trained predictive model by applying the trained predictive model to the first subset of the stored information, evaluating a second plurality of prediction errors resulting from the application of the trained predictive model to the first subset of the stored information, and combining the first and second plurality of prediction errors to create a combined number of prediction errors associated with the training algorithm;

selecting one of the plurality of training algorithms having a smallest combined number of associated prediction errors;

training by the system the predictive model using the selected training algorithm and the stored information; and predicting by the system at least one reason for a current customer call received from the at least one customer, utilizing a processor of the system and the predictive model.

14. A system, comprising:

a memory system; and one or more processing cores coupled to the memory system and that are each configured for:

storing, by a system, information in a hardware database of the system that is associated with a plurality of transactions conducted by the customer, the information including order information, usage information, bill information, payment information, and historical call data detailing historical calls made by the customer, including for each call:

a reason for the customer's call, issues addressed during the call, a resolution of the call, a duration of the call, and a location of the customer during the call;

partitioning the stored information into a first subset and a second subset, identifying a plurality of training algorithms, for each of the plurality of training algorithms:

training a predictive model utilizing the training algorithm and the first subset of the stored information, testing the trained predictive model by applying the trained predictive model to the second subset of the stored information, evaluating a first plurality of prediction errors resulting from the application of the trained predictive model to the second subset of the stored information, training the predictive model utilizing the training algorithm and the second subset of the stored information, testing the trained predictive model by applying the trained predictive model to the first subset of the stored information, evaluating a second plurality of prediction errors resulting from the application of the trained predictive model to the first subset of the stored information, and combining the first and second plurality of prediction errors to create a combined number of prediction errors associated with the training algorithm;

selecting one of the plurality of training algorithms having a smallest combined number of associated prediction errors;

training by the system the predictive model using the selected training algorithm and the stored information; and predicting by the system at least one reason for a current customer call received from the at least one customer, utilizing the predictive model.

* * * * *